(12) United States Patent
Adams, Jr.

(10) Patent No.: US 12,378,160 B1
(45) Date of Patent: Aug. 5, 2025

(54) METHOD OF REINFORCING INDUSTRIAL EQUIPMENT

(71) Applicant: DRAGON INDUSTRIAL WRAP, LLC, Lumberton, TX (US)

(72) Inventor: Henry W. Adams, Jr., Lumberton, TX (US)

( * ) Notice: Subject to any disclaimer, the term of this patent is extended or adjusted under 35 U.S.C. 154(b) by 623 days.

(21) Appl. No.: 17/535,324

(22) Filed: Nov. 24, 2021

(51) Int. Cl.
*C04B 26/14* (2006.01)
*B28C 5/02* (2006.01)
*C04B 14/38* (2006.01)
*C04B 24/12* (2006.01)
*C04B 103/10* (2006.01)

(52) U.S. Cl.
CPC ............. *C04B 26/14* (2013.01); *B28C 5/023* (2013.01); *C04B 14/386* (2013.01); *C04B 24/121* (2013.01); *C04B 2103/10* (2013.01)

(58) Field of Classification Search
CPC ..... C04B 26/14; C04B 14/386; C04B 24/121; C04B 2103/10; B28C 5/023; F16L 58/1063; F16L 58/1054; F16L 58/16; B32B 2419/00; B32B 2260/021; B32B 2597/00
See application file for complete search history.

(56) References Cited

U.S. PATENT DOCUMENTS

| 5,616,634 | A | * | 4/1997 | Pfeil | ................... | C08G 18/0814 |
| | | | | | | 523/404 |
| 2014/0048164 | A1 | * | 2/2014 | Souza | ................. | F16L 58/1054 |
| | | | | | | 138/172 |

FOREIGN PATENT DOCUMENTS

WO   WO-2016159224 A1 * 10/2016 ............. C08G 59/18

* cited by examiner

*Primary Examiner* — Vishal I Patel
(74) *Attorney, Agent, or Firm* — Kearney, McWilliams & Davis, PLLC; Dileep Rao

(57) ABSTRACT

A method of reinforcing industrial equipment, which includes the steps of providing a wrapping material, mixing an epoxy and a curing agent to create a bonding mixture, adding an aggregate material to the bonding mixture to create a bonding concrete, applying the bonding concrete to the wrapping material to create a reinforcing wrap, and wrapping the reinforcing wrap around the industrial equipment. The method makes use of use of an aggregate material to create a concrete, and add to the compressive strength of the wrapped pipe as well as allowing the wrapping material to withstand greater heat and provide insulating properties.

12 Claims, No Drawings

METHOD OF REINFORCING INDUSTRIAL EQUIPMENT

FIELD

The present disclosure generally relates to a method of reinforcing industrial equipment such as pressure vessels or piping.

BACKGROUND

Industrial equipment, such as pressure vessels and pipes, often require field repair or reinforcement due to various structural defects. Usage in harsh environments will often cause corrosion, mechanical wear, grooves, pitting, thinning of structure walls, or even holes in the equipment.

A common practice in repairing such equipment, especially pipe, is to reinforce it with a polymer or carbon fiber wrap. Such a repair is desirable due to its light weight and minimal occupied space.

The present disclosure provides a novel method of wrapping industrial equipment which allows for greater strength and heat resistance capability than currently utilized methods.

DETAILED DESCRIPTION OF THE EMBODIMENTS

Before explaining the present disclosure in detail, it is to be understood that the disclosure is not limited to the specifics of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only, and are not intended to be limiting.

Specific structural and functional details disclosed herein are not to be interpreted as limiting, but merely as a basis of the claims and as a representative basis for teaching persons having ordinary skill in the art to variously employ the present embodiments. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the claims and/or the specification may mean "one," but it is also consistent with the meaning of "one or more," "at least one," and "one or more than one."

The word "about", when referring to values, means plus or minus 5% of the stated number.

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

When methods are disclosed or discussed, the order of the steps is not intended to be limiting, but merely exemplary unless otherwise stated.

Accordingly, the scope of protection is not limited by the description herein, but is only limited by the claims which follow, encompassing all equivalents of the subject matter of the claims. Each and every claim is hereby incorporated into the specification as an embodiment of the present disclosure. Thus, the claims are a further description and are an addition to the embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

The embodiments of the present disclosure generally relate to a method of reinforcing industrial equipment such as pressure vessels or piping.

While the method is applicable to any cylindrical or substantially cylindrical structure requiring reinforcement, the present disclosure will utilize pipe or piping for exemplary purposes. This is not intended to be limiting in any manner.

The novelty of the present disclosure is in the use of an aggregate material to add to the compressive strength of the wrapped pipe as well as allowing the wrapping material to withstand greater heat and provide insulating properties.

The method of reinforcing industrial equipment can comprise the steps of providing a wrapping material, mixing an epoxy and a curing agent to create a bonding mixture, adding an aggregate material to the bonding mixture to create a bonding concrete, applying the bonding concrete to the wrapping material to create a reinforcing wrap, wrapping the reinforcing wrap around the industrial equipment.

Various fabrics have been utilized as a wrapping material for reinforcing pipe by persons having ordinary skill in the art. Materials with fibers having a high strength to weight ratio are preferred.

The wrapping material can comprise carbon fiber, ultra-high-molecular-weight polyethylene (UHMWPE), aromatic polyamide (e.g., KEVLAR®), fiberglass, or combinations thereof.

UHMWPE is a long chain polyolefin, sometimes referred to as high-modulus polyethylene, (HMPE). It is resistant to both acids and bases, as well as a large range of organic solvents.

Fabrics comprising aromatic polyamides, or aramid fibers, also have excellent strength to weight ratios and chemical resistance.

Carbon fiber fabrics and fiberglass are also well known to persons having ordinary skill in the art. The appropriate wrapping material can be selected based upon the specific application.

The epoxy can comprise bisphenol A and p-tertbutylphenyl glycidyl ether. The bisphenol A can be at a concentration from about sixty percent (60%) to about ninety-five percent (95%) by weight. The p-tertbutylphenyl glycidyl ether can be at a concentration from about five percent (5%) to about fifteen percent (15%) by weight.

Bisphenol A I (BPA) is an organic compound having the formula $(CH_3)_2C(C_6H_4OH)_2$. BPA based materials are known to be tough and flame resistant. P-tertbutylphenyl glycidyl ether is an aromatic compound having the formula $C_{13}H_{18}O_2$.

A curing agent comprising isophoronediamine can be added to the epoxy. Isophorone diamine (IPDA) is a diamine with the formula $(CH_3)_3C_6H_7(NH_2)(CH_2NH_2)$. It is a colorless liquid. The isophoronediamine can be at a concentration from about fifty percent (50%) to about seventy-five percent (75%) by weight.

The epoxy and the curing agent can be mixed within a pouch or other container to create a bonding mixture. A baton or rod can be used to stir and mix the epoxy and the curing agent. In embodiments, a spoon, or a flat wooden stick can be used for this purpose. In embodiments a plastic bag can be utilized for convenient application of the bonding mixture to the wrapping material.

The aggregate adds strength and heat resistance capability to the epoxy. It acts to insulate the wrapping material and fabric from any heat from the pipe being wrapped by allowing heat to be dissipated via convection. The aggregate can comprise a chalk, a powder, glass, silica gel, sand, or combinations thereof.

The aggregate can be added to the bonding mixture to create a bonding concrete. The rod can be used to mix the aggregate with the bonding mixture to create a substantially homogenous mixture.

The bonding concrete can be applied to the wrapping material. In embodiments a hole can be cut in the pouch or bag in which the bonding concrete was mixed to apply the bonding concrete to the wrapping material. The rod can be used to apply the bonding concrete evenly to the wrapping material to create a reinforcing wrap. The reinforcing wrap can then be wrapped around the industrial equipment needing reinforcement.

A kit for reinforcing industrial equipment can be provided to implement the method described above. The kit can have a wrapping material, an epoxy base, a curing agent, an aggregate material, a pouch to mix the epoxy base, the curing agent, and the aggregate within, and a baton for mixing and applying the epoxy base, the curing agent, and the aggregate to the carbon fiber reinforced fabric.

While the present disclosure emphasizes the presented embodiments and Figures, it should be understood that within the scope of the appended claims, the disclosure might be embodied other than as specifically enabled herein.

What is claimed is:

1. A method of reinforcing industrial equipment comprising:
   a. providing a wrapping material;
   b. mixing an epoxy and a curing agent to create a bonding mixture;
   c. adding an aggregate material to the bonding mixture to create a bonding concrete;
   d. applying the bonding concrete to the wrapping material to create a reinforcing wrap; and
   e. wrapping the reinforcing wrap around the industrial equipment.

2. The method of claim 1, wherein the wrapping material comprises:
   a. carbon fiber;
   b. ultra-high-molecular-weight polyethylene;
   c. aromatic polyamide;
   d. fiberglass; or
   e. combinations thereof.

3. The method of claim 1, wherein the epoxy comprises bisphenol A and p-tertbutylphenyl glycidyl ether.

4. The method of claim 1, wherein the curing agent comprises isophoronediamine.

5. The method of claim 1, wherein the wrapping material is carbon fiber reinforced fabric.

6. The method of claim 1, wherein the ratio of the epoxy to the curing agent is from 2:1 to 4:1 by weight.

7. The method of claim 1, wherein the ratio of the epoxy to the curing agent is from 2.5:1 to 3.5:1 by weight.

8. The method of claim 1, wherein the ratio of the epoxy to the curing agent is about 3:1 by weight.

9. The method of claim 1, wherein the aggregate material comprises:
   a. a chalk;
   b. a powder;
   c. glass;
   d. silica gel;
   e. sand; or
   f. combinations thereof.

10. The method of claim 3, wherein the bisphenol A is at a concentration from sixty percent (60%) to ninety-five percent (95%) by weight.

11. The method of claim 3, wherein the p-tertbutylphenyl glycidyl ether is at a concentration from five percent (5%) to fifteen percent (15%) by weight.

12. The method of claim 4, wherein the isophoronediamine is at a concentration from fifty percent (50%) to seventy-five percent (75%) by weight.

* * * * *